United States Patent [19]

Brueggemann

[11] Patent Number: 5,002,665
[45] Date of Patent: Mar. 26, 1991

[54] DEVICE FOR FILTERING WATER WITH FILTER INSERT

[75] Inventor: Dietrich Brueggemann, Wiesbaden, Fed. Rep. of Germany

[73] Assignee: Surex-Wasseraufbereitungsanlagen, Fed. Rep. of Germany

[21] Appl. No.: 379,096

[22] Filed: Jul. 13, 1989

[51] Int. Cl.$^5$ .............................................. B01D 24/00
[52] U.S. Cl. ..................... 210/266; 210/282
[58] Field of Search ............... 210/266, 282, 283, 285

[56] References Cited

U.S. PATENT DOCUMENTS

| | | | |
|---|---|---|---|
| 1,162,455 | 11/1915 | Collins | 210/282 X |
| 3,307,335 | 3/1967 | Shomaker | 210/282 X |
| 4,151,254 | 4/1979 | Gimovsky | 210/282 X |
| 4,306,971 | 12/1981 | Hankammer | 210/282 |
| 4,552,657 | 11/1985 | Ogawa | 210/266 X |

FOREIGN PATENT DOCUMENTS

| | | | |
|---|---|---|---|
| 0637128 | 4/1928 | France | 210/282 |
| 0462392 | 3/1937 | United Kingdom | 210/282 |

Primary Examiner—Charles Hart
Attorney, Agent, or Firm—Gifford, Groh, Sprinkle, Patmore and Anderson

[57] ABSTRACT

A device for filtering water with a filter insert (1) which has a groove (7) in its periphery parallel to the axis of the cylinder which forms the insert. The groove (7) cooperates with a wall projection of a water hopper (20).

11 Claims, 2 Drawing Sheets

DEVICE FOR FILTERING WATER WITH FILTER INSERT

BACKGROUND OF INVENTION

The invention relates to a device for filtering water with a filter insert which has an essentially cylindrically formed peripheral wall, bottom with outlet openings, a cover with inlet openings and a filling of filter material.

Filter inserts of the kind referred to above are commercially available. They are used in devices for filtering water, especially for the household, and comprise a pot and a water hopper to be put on the pot. The hopper has a lower opening to take up the filter insert so that the insert can be quickly replaced, if used up.

Replacing of the filter insert must simply be possible by unskilled persons also without preknowledges, and doing so, sufficient sealing must be assured between filter insert and hopper, so that the water to be filtered does not bypass the filter. Since the hopper together with the filter insert and, as the case is, a hopper cover stays onto the pot also when pouring the water, it must be ensured that the insert be fired in the hopper also when there is a greater inclination and no leaking will occur also when further water will be filled into the hopper.

SUMMARY OF THE INVENTION

It is an object of the present invention to provide a device for filtering water with a filter insert which does not become loose in use of the device.

A further object is to provide a device for filtering water with a filter insert which can be easily replaced.

According to invention, the insert has a groove or depression arranged at its peripheral wall parallel to the axis of the insert. The groove takes up a projection dimensioned in that it will be clamped in the groove when mounting the filter insert into the hopper. The clamping effect is only perfunctorily. Having in mind the tolerances of the filter insert and of the hopper and the slight deformations of these parts when in use, a clamping effect can be produced which stays in the desired range and will not become too hard for demounting the insert. Without the groove, the desired clamping force could only be produced with narrow tolerances and not for extended periods of the device being in use.

Further details of the invention are described in the subclaims. In that respect, the groove should begin beneath the rim of the cover and go through the bottom rim. Sealing between filter cover and filter insert therefore is not effected by the groove. The groove can have different cross sections, a half-circular cross section however is preferred.

In order to improve the clamping effect without having great differences between dry and wet condition, the groove can be roughened in the region adjacent to the filter cover or be provided with corrugations. Also the projection in the hopper can be shaped accordingly.

The holding force between filter insert and hopper can be improved by providing the groove with a recess in the region adjacent to the filter cover and the projection of the hopper can be shaped so as to snap into such recess, when the filter insert is mounted. The recess and the projection may be directed laterally or radially. In any case, a defined position of the insert is made sure.

In order to improve the filtering effect and to retain the granular filter material in the interior of the filter insert, each a filter gauze is provided between filter material and the bottom on the one side and filter cover on the other side. In the region of the filter cover, the gauze is useful as a prefilter and in the region of the bottom as a postfilter. The filter gauze preferably is made of synthetic fibers and the edge is bonded or adhered to the filter insert and the filter cover, respectively, preferably by fusing. The filter gauze can have a size of mesh in the range between 20 and 80 $\mu m$ whereas a mesh of 45 $\mu m$ or so is preferred.

If two different filter materials are to be used in the insert, for example in the upper part resin grain and in the lower part activated carbon grain, a filter plate can be provided to snap into a circular groove in the peripheral wall of the insert.

The improved water-filtering device together with additional features and advantages thereof will be best understood upon reading of the following detailed description of certain specific embodiments with reference to the accompanying drawings.

DESCRIPTION OF THE PREFERRED EMBODIMENTS

Figure 4:
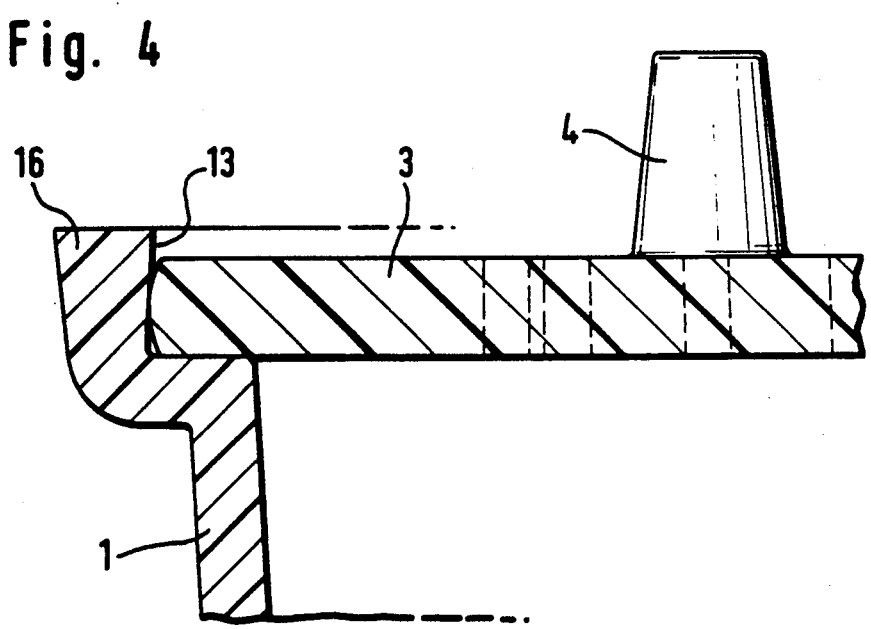
FIG. 4 is an enlarged view of a detail of the filter insert.

The filter insert 1 comprises a peripheral wall which has the shape of a circular cylinder having a slight taper from an upper flange rim 16 to a bottom 2. The insert 1 is filled with commercial filter material (not shown) which can consist of resin grains and activated carbon grains, the surfaces thereof can carry a silver layer. On top of the insert 1 is a filter cover 3 having a central handle 4. The cover 3 is welded to the insert 1 or fixed thereto by clamping, as FIG. 4 shows.

In that respect, the inner face 13 of the flange 16 rim has a diameter which is smaller by 0.3 to 0.4 mm than the outer diameter of the cover 3, the edge thereof is rounded as shown. The inner face 13 can be frustoconically shaped, that is slightly widening downwardly. The parts are made up of plastics, i.e. polypropylene.

Figure 1:
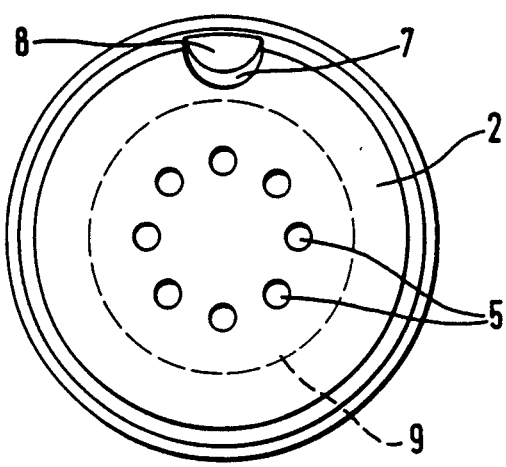
FIG. 1 is a view from below of a filter insert of the invention.
Figure 3:
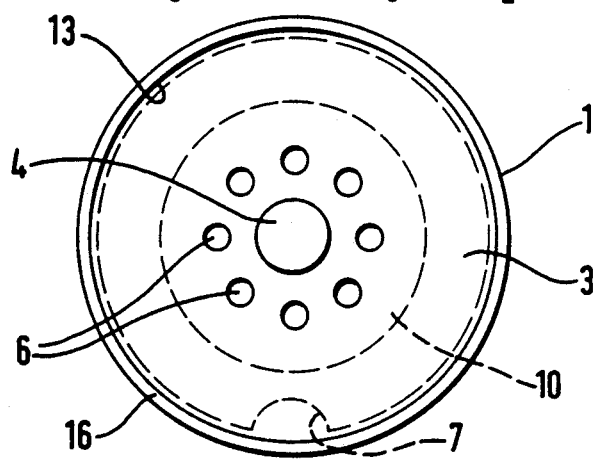
FIG. 3 is a view from above of the filter insert.

As can be seen from FIGS. 1 and 3, the filter cover 3 has inlet openings 6 and the bottom 2 outlet openings 5.

Figure 5:
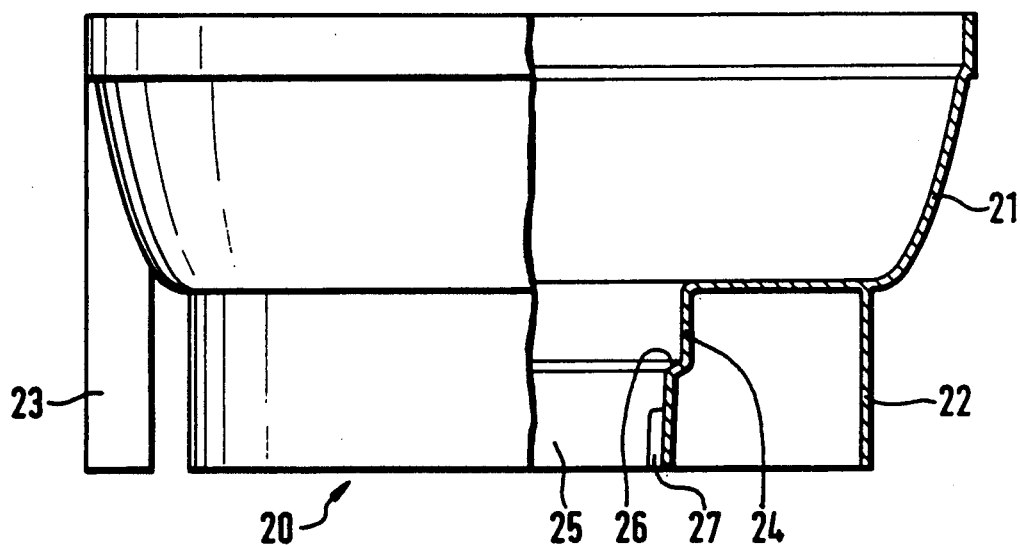
FIG. 5 is a partially sectional and side view of a water hopper.

FIG. 5 shows a water hopper 20 comprising a cup-shaped wall 21, an annular supporting wall 22, a handle 23 and an annular filter-holding wall 24. The wall 24 surrounds a space 25 which has the same shape as the insert 1 and especially comprises a shoulder 26 and a nose or projection 27. Insert 1 therefore can be inserted in the space 25 from above, the flange rim 16 engaging the shoulder 26.

The peripheral wall of the insert 1 is bent to the interior to form a groove or depression 7 which is arranged parallel to the axis of the insert 1. Groove has a half-circular cross section or so, begins at 8 beneath the flange rim 16 and is extended to the bottom 2. Groove 7 can have a roughened surface in the upper region thereof, for example in the form of corrugations. It is also possible to provide the groove 7 with a recess in the region adjacent to the flange rim 16, such recess being directed laterally or radially. The nose or projection 27 of the hopper may snap into such groove and recess and hold the insert in a definite position.

The circular filter gauze 9 is fused with its edge onto the upper surface of the bottom 2 in the region of the outlet openings 5 and a similar filter gauze 10 is fused with its edge to the lower surface of the cover 3 in the region of the inlet openings 6. For that purpose, the filter gauze 9, 10 is made up of fusible plastic fibers which can be welded to the bottom 2 and the cover 3, respectively. The mesh aperture of the filter gauze is about 45 $\mu$m, but also mesh aperture between 20 and 80 $\mu$m can be used. The filter gauzes 9 and 10 hold the granular filter material within the insert 1 and prevent the grain from falling out whether being wet or dry. Furthermore, the filter gauze has an effect as a prefilter or postfilter. If used, the upper filter gauze 10 is wet and sags a little, since it is only fixed along its circular edge. Inlet openings 6 therefore are free from the gauze and the air can easily enter through the gauze into the interior of the insert as the water drops down. It should be noted that the filter gauze has the prescribed quality for food in order to ensure unobjectable water quality.

Figure 2:
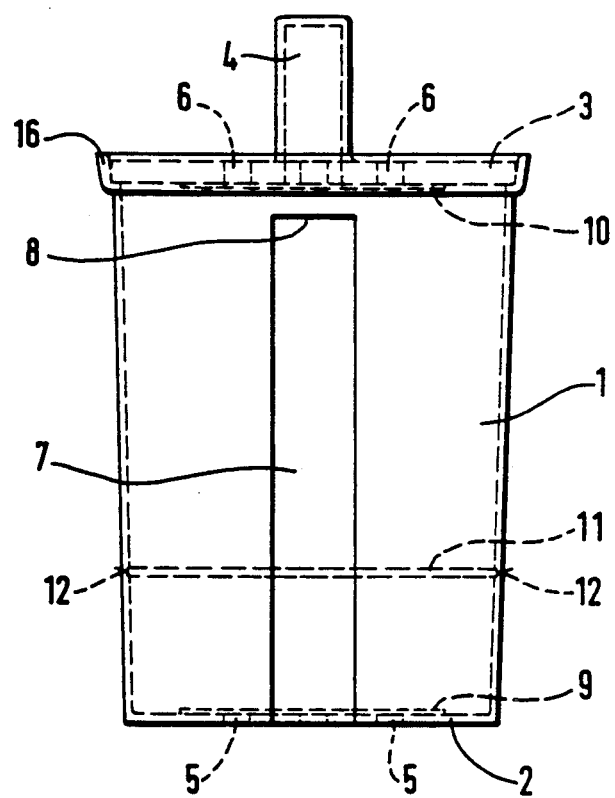
FIG. 2 is a sideview of the filter insert of FIG. 1.

A screen plate 11 diametrically shown in FIG. 2 subdivides the insert into two chambers, so that different filter materials can be filled in. Screen plate 11 is to be inserted into the filter insert 1 and snaps, with its edge, into a circular groove 12 on the inner side of the peripheral wall of the insert.

What is claimed is:

1. A device for filtering water comprising
a hopper and a filter insert,
said hopper having means for supporting said filter insert including a wall projection,
said filter insert having a peripheral wall, a bottom wall and a filter cover,
said periphral wall being of a circular cylindrical shape having a slight taper from said cover to said bottom,
said cover comprising inlet openings and
said bottom comprising outlet openings,
said peripheral wall of said insert having a depression to form a groove which extends parallel to the axis of said cylinder, said groove being dimensioned to cooperate with and reversably clamp said wall projection of said hopper therein,
and a filling of filter material which is included in said insert between said peripheral wall, said cover and said bottom.

2. The device set forth in claim 1 wherein said peripheral wall has a flange rim and said groove extends from beneath said flange rim to said bottom.

3. The device set forth in claim 1 wherein said groove has a half-circular cross-section.

4. The device according to claim 1 wherein said groove is roughened in its upper region adjacent to said flange rim.

5. The device set forth in claim 1 wherein the groove has a recess in its upper region adjacent to said flange rim.

6. The device set forth in claim 1 wherein a first and a second circular filter gauze patch made up of plastic fibers are provided, wherein said filter cover comprising a circular plate having an upper and a lower surface and said bottom comprising a circular wall having an upper and a lower surface, said first filter gauze patch having a circular edge which is adhered to said lower surface of said filter cover and said second filter gauze patch having a circular edge which is adhered to said upper surface of said bottom wall.

7. The device set forth in claim 6 wherein said first filter gauze patch is fused to said filter cover and said second filter gauze patch is fused to said bottom wall.

8. The device according to claim 6 wherein said first and said second filter gauze patches each have a size of mesh in the range between 20 and 80 $\mu$m.

9. The device according to claim 1 wherein said peripheral wall, on said inner side thereof, has a circular groove, and wherein a screen plate is provided which has a circular edge dimensioned so as to snap into said circular groove.

10. The device set forth in claim 1 wherein said peripheral wall has a flange rim enclosing a circular space, said filter cover having a circular edge dimensioned so as to be inserted into said circular space with pressfit.

11. The device set forth in claim 1 wherein said hopper comprises an annular filter-holding wall surrounding a space shaped according to said insert, said wall projection narrowing said space.

* * * * *